US008997073B2

(12) United States Patent
Ravi et al.

(10) Patent No.: US 8,997,073 B2
(45) Date of Patent: Mar. 31, 2015

(54) SEMI-AUTOMATIC RESTRUCTURING OF OFFLOADABLE TASKS FOR ACCELERATORS

(71) Applicant: NEC Laboratories America, Inc., Princeton, NJ (US)

(72) Inventors: Nishkam Ravi, Lawrenceville, NJ (US); Yi Yang, Edison, NJ (US); Srimat Chakradhar, Manalapan, NJ (US)

(73) Assignee: NEC Laboratories America, Inc., Princton, NJ (US)

( * ) Notice: Subject to any disclaimer, the term of this patent is extended or adjusted under 35 U.S.C. 154(b) by 0 days.

(21) Appl. No.: 14/261,897

(22) Filed: Apr. 25, 2014

(65) Prior Publication Data

US 2014/0325495 A1    Oct. 30, 2014

Related U.S. Application Data

(63) Continuation-in-part of application No. 13/940,974, filed on Jul. 12, 2013, now Pat. No. 8,893,103.

(60) Provisional application No. 61/816,049, filed on Apr. 25, 2013.

(51) Int. Cl.
*G06F 9/45* (2006.01)
*G06F 9/50* (2006.01)

(52) U.S. Cl.
CPC .............. *G06F 8/452* (2013.01); *G06F 8/4441* (2013.01); *G06F 9/5027* (2013.01); *G06F 2209/509* (2013.01)
USPC ............................ 717/160; 717/151; 717/159

(58) Field of Classification Search
CPC ......... G06F 8/33; G06F 8/443; G06F 8/4441; G06F 8/452; G06F 9/46; G06F 9/5027; G06F 2209/509
USPC ................................. 717/110–113, 151–161
See application file for complete search history.

(56) References Cited

U.S. PATENT DOCUMENTS

| 8,046,745 | B2 * | 10/2011 | Wong | 717/130 |
|---|---|---|---|---|
| 8,214,818 | B2 * | 7/2012 | Liu et al. | 717/160 |
| 8,561,037 | B2 * | 10/2013 | Wallach et al. | 717/140 |
| 8,793,675 | B2 * | 7/2014 | Lin et al. | 717/160 |
| 2008/0134150 | A1 * | 6/2008 | Wong | 717/130 |
| 2009/0064095 | A1 * | 3/2009 | Wallach et al. | 717/106 |
| 2009/0064120 | A1 * | 3/2009 | Liu et al. | 717/160 |
| 2012/0167069 | A1 * | 6/2012 | Lin et al. | 717/160 |

(Continued)

OTHER PUBLICATIONS

Agarwal et al., "Automatic Partitioning of Parallel Loops and Data Arrays for Distributed Shared-Memory Multiprocessors," Sep. 1995, IEEE, p. 943-962.*

(Continued)

*Primary Examiner* — Qing Chen
(74) *Attorney, Agent, or Firm* — Joseph Kolodka (57) ABSTRACT

A computer implemented method entails identifying code regions in an application from which offloadable tasks can be generated by a compiler for heterogenous computing system with processor and accelerator memory, including adding relaxed semantics to a directive based language in the heterogenous computing for allowing a suggesting rather than specifying a parallel code region as an offloadable candidate, and identifying one or more offloadable tasks in a neighborhood of code region marked by the directive.

14 Claims, 4 Drawing Sheets

(56) References Cited

U.S. PATENT DOCUMENTS

2013/0232476 A1* 9/2013 Varma et al. ............... 717/150
2014/0208327 A1* 7/2014 Cadambi et al. ............ 718/103

OTHER PUBLICATIONS

Barua et al., "Communication-Minimal Partitioning of Parallel Loops and Data Arrays for Cache-Coherent Distributed-Memory Multiprocessors," Jul. 29, 1996, Massachusetts Institute of Technology, p. 1-14.*

Lee et al., "OpenMP to GPGPU: A Compiler Framework for Automatic Translation and Optimization," Feb. 2009, ACM.*

Baskaran et al., "Automatic C-to-CUDA Code Generation for Affine Programs," 2010, Springer-Verlag, p. 244-263.*

Ferrer et al., "Analysis of Task Offloading for Accelerators," 2010, Springer-Verlag, p. 322-336.*

Koesterke et al., "Early Experiences with the Intel Many Integrated Cores Accelerated Computing Technology," Jul. 2011, ACM.*

Duran et al., "The Intel® Many Integrated Core Architecture," 2012, IEEE, p. 365-366.*

Ravi et al., "Apricot: An Optimizing Compiler and Productivity Tool for x86-compatible Many-core Coprocessors," Jun. 2012, ACM, p. 47-57.*

Stanzione et al., "Preparing for Stampede: Programming Heterogeneous Many-Core Supercomputers," Jul. 16, 2012, XSEDE 12, p. 1-30.*

* cited by examiner

SEMI-AUTOMATIC RESTRUCTURING OF OFFLOADABLE TASKS FOR ACCELERATORS

RELATED APPLICATION INFORMATION

This application is a continuation-in-part of U.S. application Ser. No. 13/940,974, filed on Jul. 12, 2013, which in turn claims priority to provisional application Ser. No. 61/683,782, filed on Aug. 16, 2012, and this application claims priority to provisional application Ser. No. 61/816,049, filed on Apr. 25, 2013, all of which are incorporated herein by reference.

BACKGROUND

1. Technical Field

The present invention relates to parallel processing and, in particular, to semi-automatic restructuring of offloadable tasks for accelerators.

2. Description of the Related Art

The Many Integrated Core (MIC) architecture is an x86-compatible, many-core co-processor aimed at accelerating applications written for multi-core processors. Parallel code regions are offloaded to MIC for execution using, e.g., #pragma directives. When a code region is offloaded, execution on the CPU is suspended until the offloaded code section executes to completion.

In the most common usage model, highly parallel code regions in an application are offloaded to MIC. The developer identifies and marks such code regions using a directive called #pragma offload. Data transfers between the host and coprocessor are specified using in/out/inout clauses. The goal of MIC is to improve overall application performance by taking advantage of higher number of cores. Although MIC is a step forward in terms of programmability compared to GPUs, a certain amount of developer effort is needed to obtain good performance gains.

SUMMARY

A computer implemented method entails identifying code regions in an application from which offloadable tasks can be generated by a compiler for heterogenous computing system with processor and accelerator memory, including adding relaxed semantics to a directive based language in the heterogenous computing for allowing a suggesting rather than specifying a parallel code region as an offloadable candidate, and identifying one or more offloadable tasks in a neighborhood of code region marked by the directive.

A heterogenous computing system entails a compiler for identifying code regions in an application from which offloadable tasks can be generated for the heterogenous computing system with processor and accelerator memory, the identifying includes adding relaxed semantics to a directive based language in the heterogenous computing for allowing a suggesting rather than specifying a parallel code region as an offloadable candidate, and identifying one or more offloadable tasks in a neighborhood of code region marked by the directive.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

When a code region is offloaded to a Many Integrated Core (MIC) processor, execution on the central processing unit (CPU) is suspended until the offloaded code region executes to completion. To offload code to MIC asynchronously without suspending CPU execution, signal and wait clauses are used. When the signal clause is used along with #pragma offload, the following code region is offloaded to MIC, dispatched for execution, and the control is returned back to the CPU immediately. The code on the CPU side continues to execute till a wait clause is encountered. The CPU blocks on the wait until the offloaded code region executes to completion. For asynchronous offload to be profitable, the CPU should have enough work to do while the offloaded code region executes on MIC.

Figure 1:
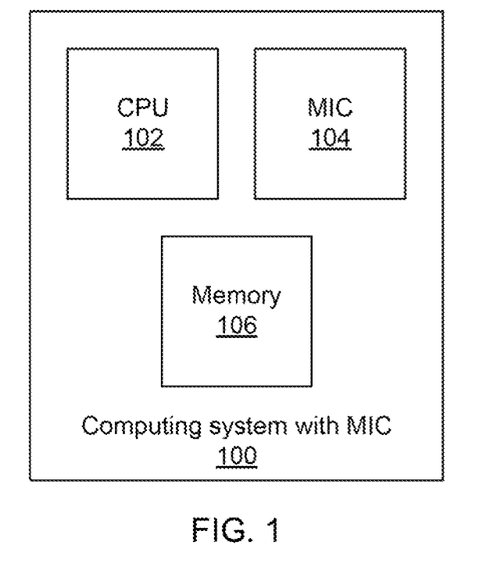
FIG. 1 is a diagram of a computing system having a many-core coprocessor in accordance with the present principles.

Referring now to the drawings in which like numerals represent the same or similar elements and initially to FIG. 1, a computing system 100 is shown. The system 100 includes a CPU 102 and one or more MIC processors 104, in communication with a memory 106. If a code region R1 is offloaded to MIC 104 and dispatched for execution, the CPU 102 goes on to execute a second code region R2 and then blocks on the wait clause. To execute code region R1 on MIC 104 concurrently with code region R2 on CPU 102 and obtain good performance, the developer has to make sure that (i) there are no dependencies between code regions R1 and R2, (ii) code region R1 is significant and parallel enough to benefit from executing on MIC 104, and (iii) the execution time of code region R1 on MIC 104 is close to the execution time of code region R2 on the CPU 102. This would require certain amount of effort on the part of the developer and a possible refactoring of the application.

Embodiments of the present invention provide a source-to-source compiler optimization for automating asynchronous offload and concurrent execution. Code regions R1 and R2 can be obtained automatically by splitting the index range of a hot parallel loop in two parts. The first sub-loop could be offloaded to MIC 104 while the second one executes on the CPU 102 in parallel. In this model, MIC 104 assists the CPU 102 in executing a hot parallel loop by sharing the load, thereby enabling true parallelism. For this transformation to be correct and profitable, a number of issues have to be taken care of. First, the split boundary should be selected in such a way that the time of execution of the first sub-loop R1 on MIC 104 is close to the execution time of the second sub-loop R2 on CPU 102. This even distribution of work ensures minimum idle time for both CPU 102 and MIC 104. Second, the transformation should be applied only if the speedup obtained by executing R1 on MIC 104 offsets the overheads of copying data into and out of MIC 104 from memory 106. Third, reduction variables and shared memory in critical sections should be handled correctly. A "critical section," as that term is used herein, is a portion of code that is executed simultaneously by two or more parallel tasks, threads, or processes, and that updates a variable that is common to the parallel tasks, threads, or processes.

Figure 2:
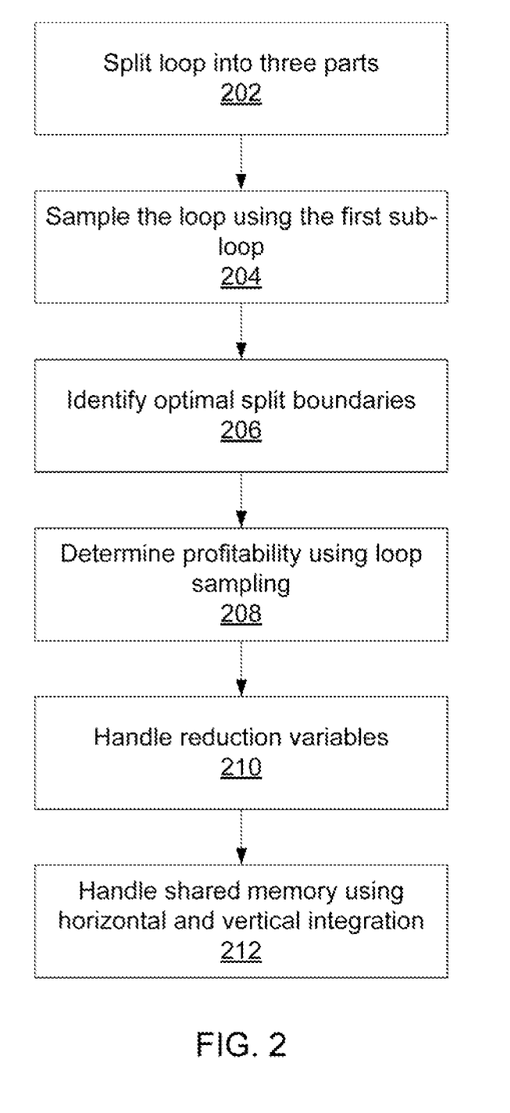
FIG. 2 is a block/flow diagram of a method for offloading computing to a many-core coprocessor in accordance with the present principles.
Figure 3:
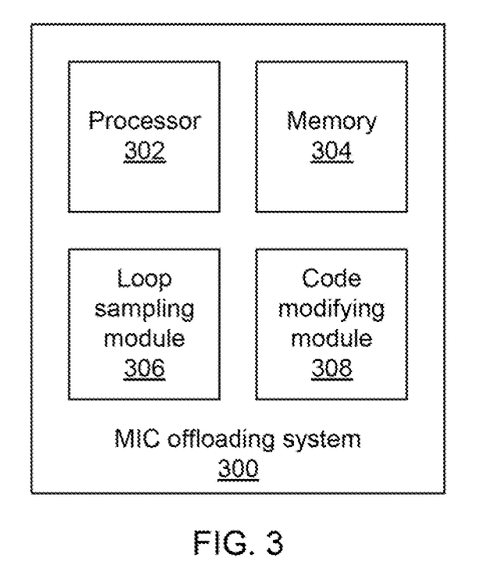
FIG. 3 is a diagram of a system for offloading computing to a many-core coprocessor in accordance with the present principles.

Referring now to FIG. 2, a method for automating asynchronous offload is shown. For a given parallelizable loop, block 202 splits the loop into three parts: a sample sub-loop, a MIC sub-loop, and a CPU sub-loop. So, for a loop that has an index running from 1 to N, the index range is split into sub-ranges of $(1, c_1)$, $(c_1+1, c_2)$, and $(c_2+1, N)$. The code for the original loop is copied into each of the new loops. Block 204 runs the sample sub-loop to characterize the loop, generating information that will be used to judge the profitability of the transformation. The first split boundary, $c_1$, should be relatively small, so as to provide the information needed without sacrificing too much of the parallelization.

Block 206 identifies the optimal split boundary $c_2$ by estimating a ratio of the execution time of an iteration on MIC 104 to the execution time of an iteration on the CPU 102. If, for example, the iteration takes twice as long to execute on CPU 102 as it does on MIC 104, then the index range of the MIC sub-loop should be roughly twice the index range of the CPU sub-loop, such that both sub-loops finish execution at roughly the same time. This leads to:

$$r=(N-c_2)/(c_2-c_1)=t_{MIC}/t_{CPU}$$

$$c_2=(N+r \cdot c_1)/(1+r),$$

Where $t_{MIC}$ and $t_{CPU}$ are the execution times for the MIC and CPU sub-loops respectively. The body of the loop may be statically analyzed to provide an estimate of the number of CPU operations and number of memory operations the body of the loop uses. Since the loop may contain inner loops with non-constant upper bounds, values for the numbers of operations are generated as functions of inner loop iterations and are given values at runtime.

As an example, block 206 may take the following code:

```
int f (...) {
    ...
    #pragma offload
    in (...) out (...)
    {
        #pragma omp parallel for
        /* hot loop */
        for ( i =0; i < N; i++){
            A[ i ] = B[ i ] * C[ i ] ;
            ...
        }
    }
    ...
}
```

Block 206 may then produce code such as:

```
int f (...) {
    ...
    gettime (&t1 ) ;
    /* sample loop ( c1 < 10) */
    for ( i =0; i < c1 ; i++) {
        A[ i ] = B[ i ] * C[ i ] ;
        ...
    }
    gettime (&t2 ) ;
    t_cpu = diff ( t2 , t1 ) ;
    r = K * (mem_ops/ cpu_ops ) ;
    c2 = (N + c1 * r ) /(1 + r ) ;
    if ( cost_model ( t_cpu, dsize, r_d , c1, c2 ){
        /* MIC loop */
        #pragma offload target (MIC) in ( .. ) out ( .. )
            signal (&f );
        {
            #pragma omp parallel for
            f o r ( i=c1 ; i < c2 ; i++){
                A[ i ] = B[ i ] * C[ i ] ;
                ...
            }
        }
        /*CPU loop */
        #pragma omp parallel for
        f o r ( i=c2 ; i < N; i++){
            A[ i ] = B[ i ] + C[ i ] ;
            ...
        }
        #pragma offload_wait target (MIC) wait(&f )
        { }
    } e l s e {
        #pragma omp parallel for
        f o r ( i=c1 ; i < N; i++){
            A[ i ] = B[ i ] * C[ i ] ;
            ...
        }
    }
}
```

The execution time of a loop iteration on MIC 104 is a function of the execution time on CPU 102 and the ratio of memory operations to CPU operations. MIC 104 does better for computationally intensive code, such that the execution time on MIC 104 to CPU 102 is roughly proportional to the ratio of memory operations to CPU operations:

$$r=t_{MIC}/t_{CPU}=f(K(\text{mem\_ops}/\text{cpu\_ops})),$$

Where K is an empirically obtained normalization factor.

Code for obtaining the value of r and $c_2$ is inserted in the source code as part of the transformation. This is because $c_2$ is obtained from the actual runtime memory operations and CPU operations. This transformation is applied to loops marked by #pragma omp parallel for that take at least 10% of the total time of execution.

Block 208 determines the profitability of the transformation by ensuring that the time taken to copy data into and out of the MIC 104 for the MIC sub-loop is offset by the gains obtained from concurrent execution. Assuming that the MIC sub-loop executes in parallel with the CPU sub-loop, the total execution time is equal to: (execution time of sample loop+ data transfer time for MIC loop+execution time of CPU loop). Let dsize be the total size of the data variables that need to be copied into and out of MIC 104 for offload and let $r_d$ be the data transfer rate. The total execution time is given by:

$$\frac{t_{cpu} \cdot c_1 + dsize}{r_d} + t_{cpu}(N - c_2).$$

The execution time of the original unmodified loop is given by $t_{cpu} \cdot N$. For this transformation to be profitable, the execution time of the transformed code should be less than that of the original code. This is the cost model function for this transformation. An "if" condition is inserted before the MIC saub-loop to invoke the cost model function. The then-branch contains the MIC sub-loop and the CPU sub-loop. The else-branch contains the original loop (with index range $(c_1, N)$).

The value of dsize is obtained by adding up the size of the data variables specified in the in/out/inout clauses for MIC sub-loop. The value of $r_d$ (which is a constant) is obtained experimentally.

The value of $t_{cpu}$ is obtained using loop sampling. Timestamps ($t_1$ and $t_2$) are inserted before and after the sample loop. The value of $t_{cpu}$ is obtained at runtime from the two timestamps:

$$t_{cpu} = \frac{t_2 - t_1}{c_1}.$$

The sample loop is created to obtain the value of $t_{cpu}$, which would otherwise have to be estimated using static analysis. This allows a handful of iterations of a loop (in the form of a sample loop) to be used to accurately estimate the execution time of one loop iteration at runtime. This approach can be used by other cost models as well (e.g auto-parallelization). The value of $t_{cpu}$ obtained in block 208 is a close approximation to the actual value of $t_{cpu}$, since data locality and cache behavior can change.

Block 210 handles reduction variables. If a parallel loop does not contain reduction variables or critical sections, no variable renaming is necessary while splitting the loop. When there are no loop carried dependencies (and hence no order of execution among the iterations) in the original loop, the MIC and CPU sub-loops can execute in parallel and perform read and write operations on private as well as shared memory. However, in the presence of reduction variables and/or critical sections, additional work needs to be done to ensure correctness.

Given a reduction variable v and reduction operation L in the original loop, a new variable $v_{mic}$ is generated and block 210 replaces all occurrences of v by $v_{mic}$ in the MIC sub-loop. Code for computing $v=v \oplus v_{mic}$ after the CPU sub-loop is generated. An example of such a transformation is shown below. The reduction variables and corresponding operators are identified from a #pragma omp clause. The original code may be, for example:

```
#pragma omp parallel for reduction(+:v)
for(i=0; i < N; i++){
    ...
    v += A[i];
    ...
}
```

Whereas a transformed version of this code may be:

```
...
if (async_cbf(..)) {
    v_mic = v;
    /* MIC loop */
    #pragma offload target(mic)..inout(v_mic) signal(&f)
    {
        #pragma omp parallel for reduction(+:v_mic)
        for(i=c1; i < c2; i++){
            ...
            v_mic += A[i];
            ...
        }
    }
    /* CPU loop */
    #pragma omp parallel for reduction(+:v)
    for(i=c2; i < N; i++){
        ...
        v += A[i];
        ...
    }
```

```
    #pragma offload_wait target(mic) wait(&f)
    { }
    v += v_mic;
} else {
    ...
}
```

A critical section is defined for the purpose of updating shared memory that must not be concurrently accessed by more than one thread. If two loops are executed in parallel, and each loop has a separate runtime, the semantics of a critical section are violated. The following code shows a parallel loop:

```
#pragma omp critical
{
    for (j = 0; j < NQ; j++)
        q[j] += qq[j];
}
```

Shared array q is updated inside a critical section. Since the two sub-loops have separate copies of array q, they would both update their own copies. However, when the MIC sub-loop finishes, its copy of array q would be copied back to the host memory in the same location as the CPU sub-loop's q. As a result, the updates from one of the two loops would be lost (depending on which of the two loops finishes first).

To preserve the semantics of a critical section, (i) shared memory variables being accessed in the critical section need to be renamed, and (ii) code for merging the updates from the two loops needs to be added.

For each #pragma omp critical section, block 210 identifies the shared memory variables being updated in the critical section. This may be accomplished done with the help of, for example a compiler's memory tag infrastructure, which keeps track of read and write operations to all memory locations. Given a shared memory variable smv, a new variable $smv_{mic}$ is generated and all occurrences of smv are replaced by $smv_{mic}$ in the MIC sub-loop. To generate code for merging $smv_{mic}$ and smv, block 210 identifies the correct merge logic. In the case of reduction variables, merging is trivial. This is because the reduction operator is known and the merge logic is to simply apply the reduction operator to the two scalar variables. This is not the case for shared memory variables in critical sections.

Block 212 handles shared memory by employing horizontal and vertical integration. Careful analysis reveals that updates to shared memory (from two different processes) can be merged in most cases using either a horizontal integration approach, a vertical integration approach, or both. Consider two non-overlapping memory regions smv and $smv_{mic}$ of same or different lengths. Intuitively speaking, in horizontal integration, the two memory regions are merged by placing one on top of the other. The values smv[i] and $smv_{mic}$[i] are combined using a merge operator ○ (such as addition, multiplication, etc). The merge operator is identified by statically analyzing the code in the critical section. The following code may be generated for horizontal integration:

```
for(i=0; i < length(smv); i++){
    smv[i] = smv[i] ○ smv mic[i];
}
```

Horizontal integration is used when the code in the critical section modifies the value of a shared memory location using an update operator, as in the case shown in the #pragma omp critical code above. The update operator in this case is +, which can be identified by parsing the code in the critical section using a set of heuristics. One exemplary heuristic is to look for both read and write to the same memory location.

In vertical integration, the two memory regions are merged by appending one to the other. Vertical integration is used when the code in the critical section modifies the value of a memory location without using an update operator. In other words, the value assigned to the memory location is not based on the previous value of the memory location. This typically corresponds to pointer operations, as in the case of dynamically allocated data structures, such as linked lists. The following code may be generated for vertical integration:

```
for(i=0; i < current length(smv mic); i++){
    smv[current length(smv) + i] = smv mic[i];
}
current length(smv) += current length(smc mic);
```

In this case, the original loop being split is parallel and hence does not carry any loop carried dependencies. This imposes restrictions on how the memory locations are accessed/updated inside the loop.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
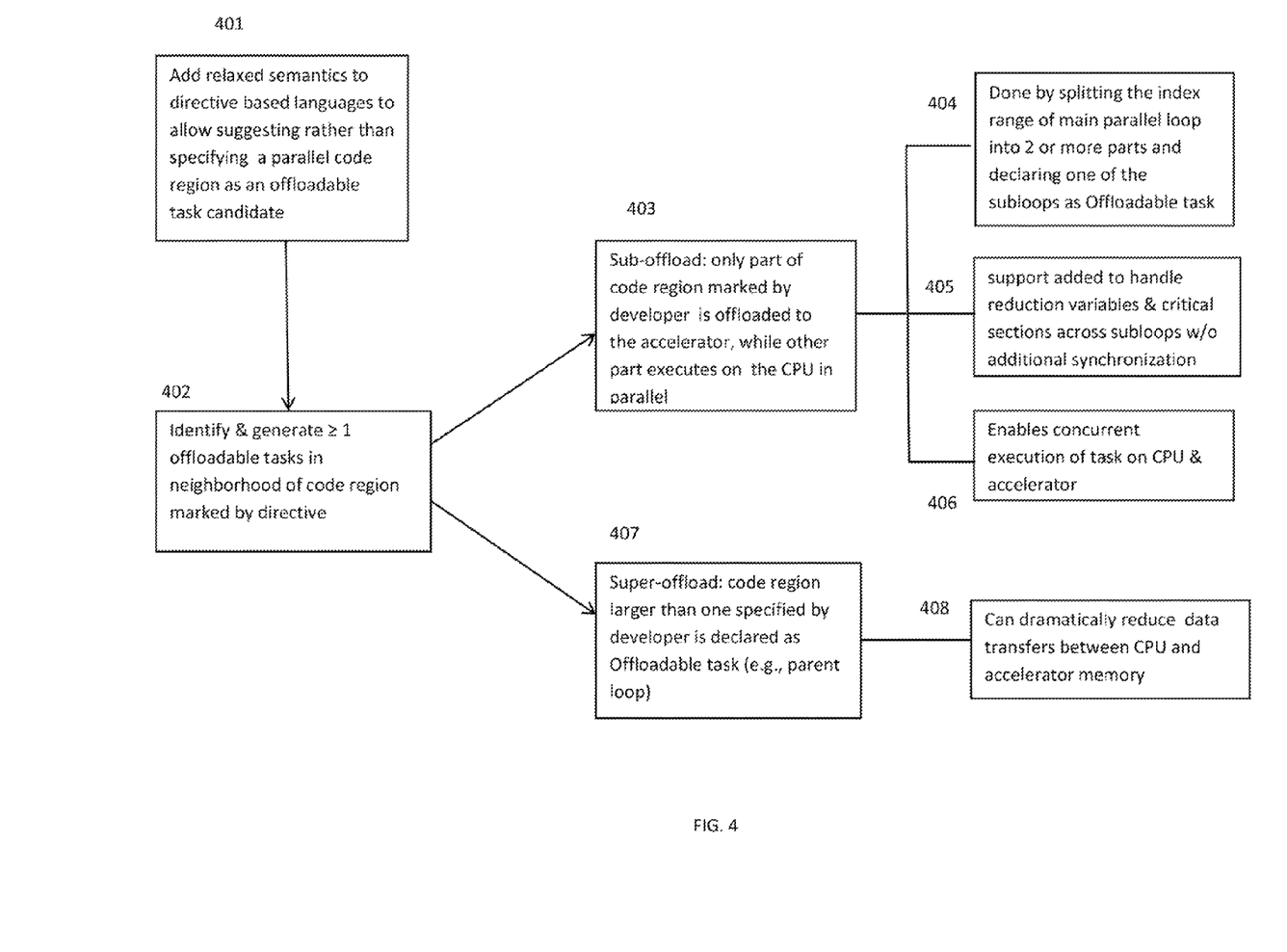
FIG. 4 is a diagram for restructuring offloadable tasks for accelerators, in accordance with the invention.

Turning now to FIG. 4, there is a diagram showing restructuring of offloadable tasks for accelerators, in accordance with the invention.

Work division between the processor and accelerator is a common theme in modern heterogeneous computing. Recent efforts (such as LEO and OpenAcc) provide directives that allow the developer to mark code regions in the original application from which offloadable tasks can be generated by the compiler. These efforts are intended to improve developer productivity and simplify code maintenance. However, the identification of optimal offloadable tasks is left up to the developer, which can result in sub-optimal performance. Auto tuners and runtime schedulers have to work with the options (i.e., offloadable tasks) generated at compile time, which is limited by the directives specified by the developer. There is no provision for offload restructuring.

The invention is directed to a method or system to add relaxed semantics to directive-based languages 401. This directive allows the user to suggest rather than specify a parallel code region as an offloadable candidate. The compiler then identifies and generates one or more offloadable tasks in the neighborhood of the code region marked by the directive 402. Central to our invention is the creation of sub-offload and super-offload. In sub-offload, only part of the code region marked by the developer is offloaded to the accelerator, while the other part executes on the CPU in parallel 403. This is done by splitting the index range of the main parallel loop into two or more parts and declaring one of the subloops as the offloadable task 404. Support is added to handle reduction variables and critical sections across the subloops, without additional synchronization 405. Sub-offload enables concurrent execution of a task on the CPU and accelerator 406. In super-offload, a code region larger than the one specified by the developer is declared as the offloadable task (e.g., a parent loop) 407. Super-offload can dramatically reduce data transfers between CPU and accelerator memory 408.

The components of FIG. 4 are further detailed in the Appendix to the Application, entitled "Semi-Automatic Restructuring of Offloadable Tasks for Accelerators".

Having described preferred embodiments of a system and method for automatic asynchronous offload (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method comprising:
    identifying code regions in an application from which one or more offloadable tasks can be generated by a compiler for a heterogenous computing system including a processor and an accelerator memory, comprising:
        adding, by the processor, relaxed semantics to a directive based language in the heterogenous computing system for allowing a user to suggest rather than specify a parallel code region as an offloadable task candidate, wherein the offloadable task candidate is a sub-offload or a super-offload; and
        identifying, by the processor, one or more offloadable tasks in a neighborhood of code region marked by the directive based language.

2. The computer implemented method of claim 1, wherein the sub-offload comprises only part of the neighborhood of code region marked by the directive based language is offloaded to the accelerator memory while the other part of the neighborhood of code region executes on the processor in parallel.

3. The computer implemented method of claim 1, wherein the sub-offload comprises splitting an index range of a main parallel loop into two or more sub-loops and declaring one of the two or more sub-loops as the offloadable task candidate.

4. The computer implemented method of claim 1, wherein the sub-offload comprises handling reduction variables and critical sections across sub-loops without additional synchronization.

5. The computer implemented method of claim 1, wherein the sub-offload comprises enabling concurrent execution of a task on the processor and the accelerator memory.

6. The computer implemented method of claim 1, wherein the super-offload comprises declaring a code region larger than a code region specified by a developer as the offloadable task candidate.

7. The computer implemented method of claim 6, wherein the super-offload comprises reducing data transfers between the processor and the accelerator memory.

8. A heterogenous computing system comprising:
a processor;
an accelerator memory; and
a compiler that identifies code regions in an application from which one or more offloadable tasks can be generated for the heterogenous computing system, wherein the identifying comprises:
adding relaxed semantics to a directive based language in the heterogenous computing system for allowing a user to suggest rather than specify a parallel code region as an offloadable task candidate, wherein the offloadable task candidate is a sub-offload or a super-offload; and
identifying one or more offloadable tasks in a neighborhood of code region marked by the directive based language.

9. The heterogenous computing system of claim 8, wherein the sub-offload comprises only part of the neighborhood of code region marked by the directive based language is offloaded to the accelerator memory while the other part of the neighborhood of code region executes on the processor in parallel.

10. The heterogenous computing system of claim 8, wherein the sub-offload comprises splitting an index range of a main parallel loop into two or more sub-loops and declaring one of the two or more sub-loops as the offloadable task candidate.

11. The heterogenous computing system of claim 8, wherein the sub-offload comprises handling reduction variables and critical sections across sub-loops without additional synchronization.

12. The heterogenous computing system of 8, wherein the sub-offload comprises enabling concurrent execution of a task on the processor and the accelerator memory.

13. The heterogenous computing system of claim 8, wherein the super-offload comprises declaring a code region larger than a code region specified by a developer as the offloadable task candidate.

14. The heterogenous computing system of claim 13, wherein the super-offload comprises reducing data transfers between the processor and the accelerator memory.

* * * * *